(12) United States Patent
Eldredge

(10) Patent No.: US 6,791,931 B2
(45) Date of Patent: Sep. 14, 2004

(54) ACCELEROMETER USING FIELD EMITTER TECHNOLOGY

(75) Inventor: Kenneth J. Eldredge, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 09/811,299

(22) Filed: Mar. 16, 2001

(65) Prior Publication Data

US 2002/0131356 A1 Sep. 19, 2002

(51) Int. Cl.$^7$ .......................... G01P 15/18; G11B 7/013
(52) U.S. Cl. ......................... 369/101; 369/126; 73/1.39
(58) Field of Search ................................ 369/101, 126; 73/1.39

(56) References Cited

U.S. PATENT DOCUMENTS

| | | | |
|---|---|---|---|
| 4,427,886 A | | 1/1984 | Martin et al. ............... 250/310 |
| 4,534,016 A | | 8/1985 | Kirkpatrick et al. ........ 365/128 |
| 4,600,839 A | | 7/1986 | Ichihashi et al. ........... 250/310 |
| 4,736,629 A | * | 4/1988 | Cole ....................... 73/514.32 |
| 4,760,567 A | | 7/1988 | Crewe ....................... 369/101 |
| 4,767,973 A | * | 8/1988 | Jacobsen et al. ............ 318/652 |
| 5,202,879 A | * | 4/1993 | Oguchi et al. ............. 369/126 |
| 5,211,051 A | * | 5/1993 | Kaiser et al. ................ 73/1.38 |
| 5,402,410 A | | 3/1995 | Yoshimura et al. ...... 369/275.1 |
| 5,481,184 A | * | 1/1996 | Jacobsen .................... 324/106 |
| 5,509,309 A | * | 4/1996 | Yokoyama et al. ...... 73/514.09 |
| 5,519,686 A | * | 5/1996 | Yanagisawa et al. ....... 369/126 |
| 5,557,596 A | | 9/1996 | Gibson et al. ............. 369/101 |
| 5,812,516 A | * | 9/1998 | Nose et al. ................. 369/126 |
| 6,073,484 A | * | 6/2000 | Miller et al. .................. 73/105 |
| 6,347,506 B1 | * | 2/2002 | Backmeister ................ 57/417 |

OTHER PUBLICATIONS

E. Huber et al., "Laser–Induced Crystallization of Amorphous GeTe: A Time–Resolved Study," Physics Review B, vol. 36, No. 3, pp. 1595–1604 (Jul. 15, 1987).

R.T. Howe et al., "Silicon Micromechanics: Sensors and Actuators on a Chip," IEEE Spectrum, pp. 29–35 (Jul. 1990).

V.P. Jaecklin et al., "Novel Polysilicon Comb Actuators for XY–Stages", Proceedings of Micro Electro Mechanical Systems, pp. 147–149 (Feb. 1992).

G.W. Jones et al., "Silicon Field Emission Transistors and Diodes," IEEE Trans. on Components, Hybrids and Manufacturing Technology, vol. 15, No. 6, pp. 1051–1055 (Dec. 1992).

C.A. Spindt et al., "Physical Properties of Thin–Film Field Emission Cathodes with Molybdenum Cones," Journal of Applied Physics, vol. 47, No. 12, pp. 5248–5263 (Dec. 1976).

B.G. Yacobi, Electron–Beam–Induced Information Storage in Hydrogenated Amorphous Silicon Device, Applied Physics Letters, vol. 44, No. 7, pp. 695–697 (Apr. 1984).

* cited by examiner

Primary Examiner—W. R. Young
Assistant Examiner—M. V. Battaglia

(57) ABSTRACT

An accelerometer includes a field emitter to generate an electron beam current and a medium. An effect is generated when the electron beam current bombards the medium. The magnitude of the effect is affected by a physical impact imparting an amount of energy to the accelerometer to cause a relative movement between the field emitter and the medium. The amount of energy imparted to the accelerometer by the physical impact is determined by measuring the magnitude of the effect. The accelerometer can be integrally implemented in a storage device.

36 Claims, 11 Drawing Sheets

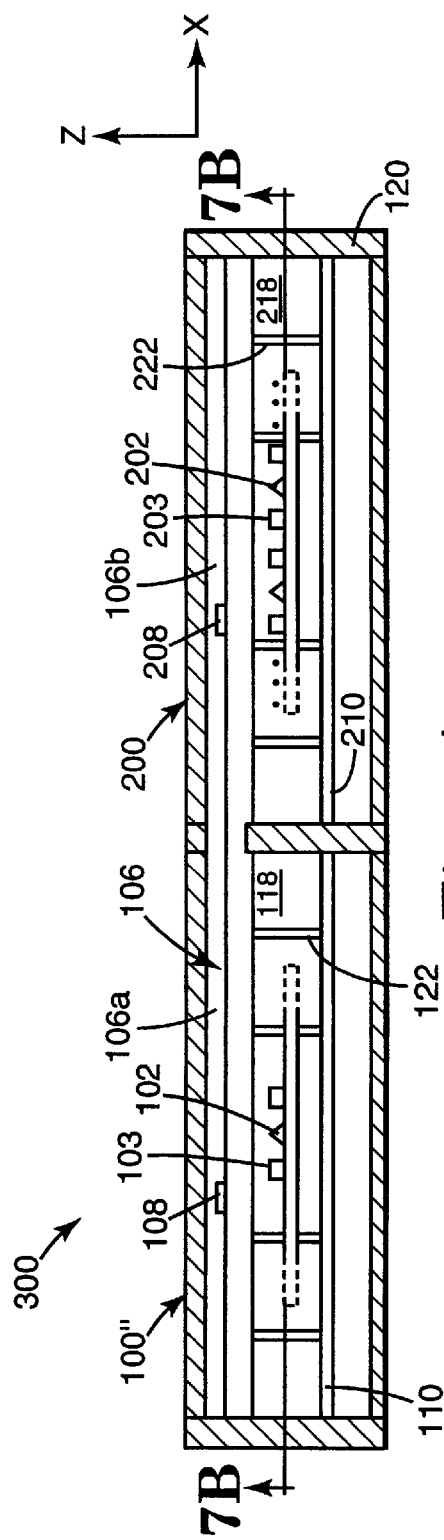
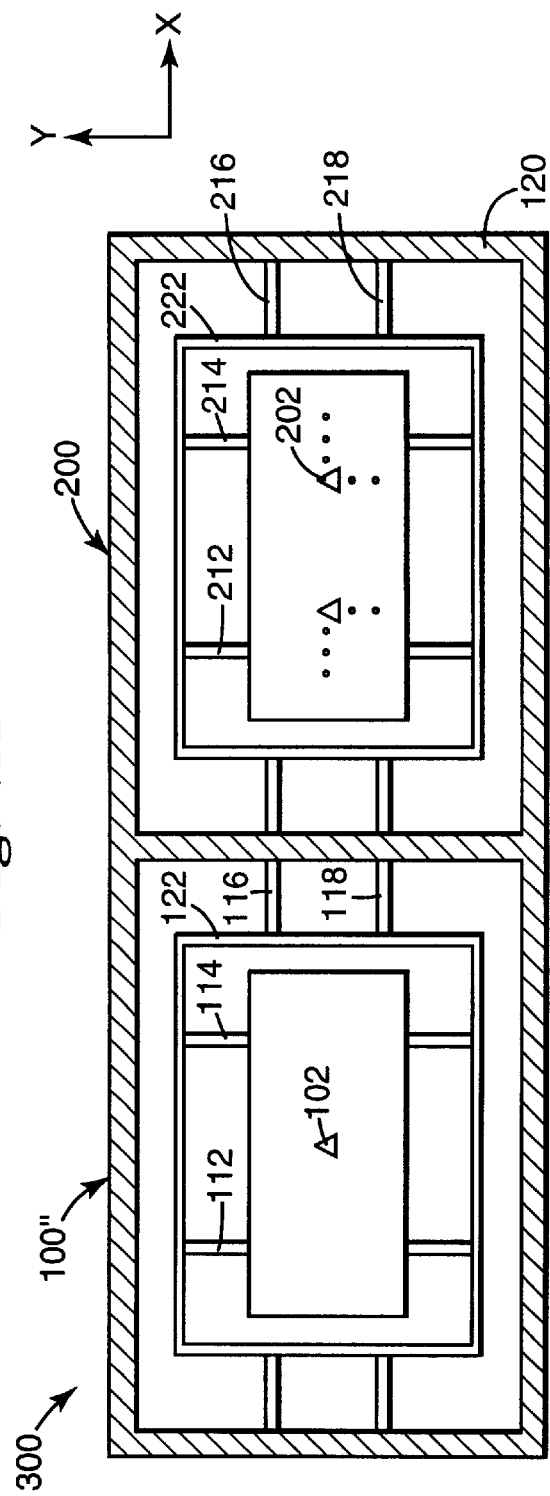
Fig. 7A
Fig. 7B

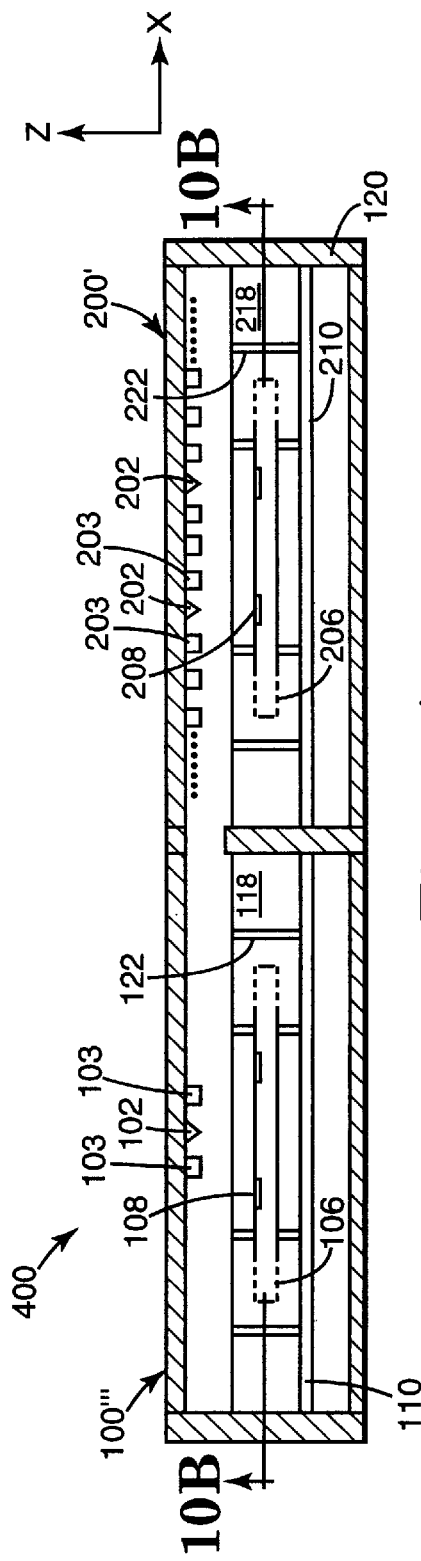
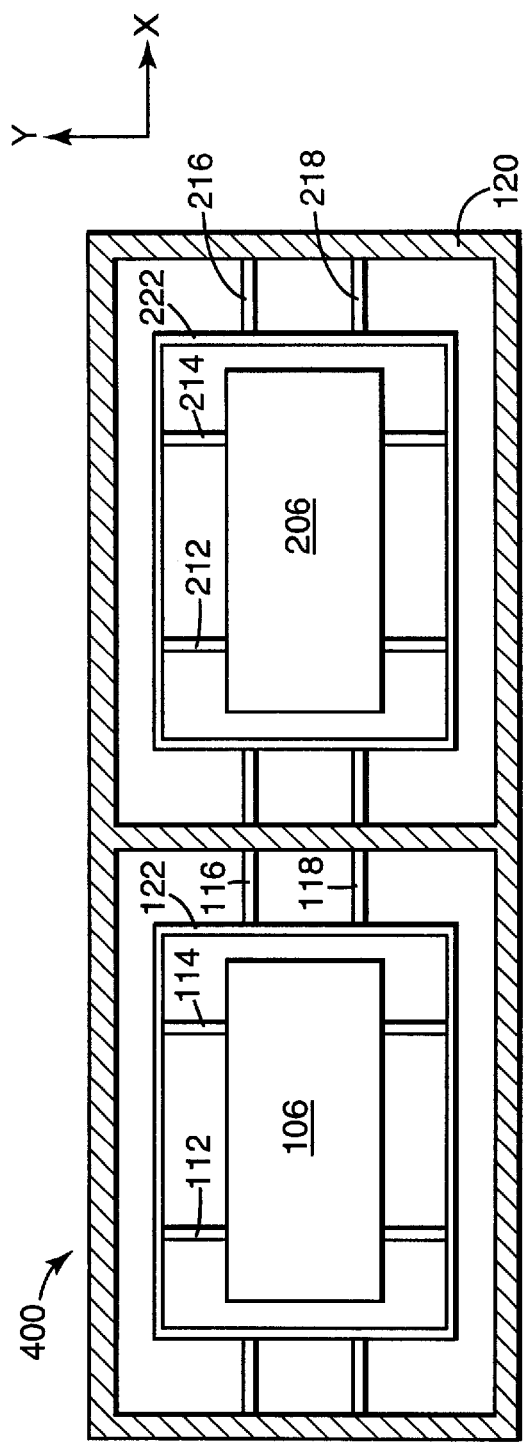
Fig. 10A
Fig. 10B

ACCELEROMETER USING FIELD EMITTER TECHNOLOGY

FIELD OF THE INVENTION

The present invention relates generally to accelerometers, and more particularly to accelerometers based on field emitter technology.

BACKGROUND OF THE INVENTION

For decades, researchers have been trying to increase the storage density and reduce the cost/storage in information storage devices, such as magnetic hard-drives, optical drives, and DRAM. However, it has become increasingly difficult to squeeze more information into the storage devices. Moreover, conventional technologies to make those devices may be approaching fundamental limits on storage density.

Many scientists have proposed alternative approaches to increase the storage density. One approach is based on Scanned Probe Microscopy (SPM) technologies. Typically, in such an approach, a probe is positioned extremely close to a storage medium. For example, in one implementation of Atomic Force Microscopy, the probe physically touches the medium; in Scanning Tunnelling Microscopy (STM), the probe is within a few nanometers of the medium to ensure that the probe is within tunneling range of the medium. It is difficult to inexpensively build a storage system with a probe in contact with or in such extremely close proximity to the medium without, eventually, damaging or effacing the surface of the medium or the probe. Moreover, in STM, the nanometer spacing must be precisely controlled. This is a difficult task. Some researchers have found methods to eliminate the need for such extremely close proximity. One technique is based on Near-Field Scanning Optical Microscopy. However, this technique has limited lateral resolution and bandwidth. Other techniques are based on non-contact Scanning Force Microscopy, which typically suffers from poor resolution and poor signal to noise ratio.

Even if one has increased the storage density, one still has to overcome another major hurdle, which is the time required to access the information. The storage device's utility is limited if it takes a long time to retrieve the stored information. In other words, in addition to high storage density, one must find a way to quickly access the information.

It should be apparent from the foregoing that there is still a need for a storage device that is based on a non-conventional approach, with significantly increased storage density, and low cost/storage. Additionally, the storage device preferably should have fast access times and high data rates. Furthermore, the storage device should preferably eliminate the requirement for extremely close proximity between the probe and storage medium.

In addition, there is a desire for a storage device system which can accurately and inexpensively detect shock from various levels and indicate the detected shock to the storage device system in such a manner that the storage device system can respond to the detected shock, such as by temporarily halting reading/writing operations or performing a power down operation. For example, in any storage device having a read/write subsystem that is moveable relative to a storage medium, it is highly undesirable to write data in the wrong location due to the read/write subsystem moving relative to the storage medium due to a shock to the storage device which can result in overwriting or destroying data.

SUMMARY OF THE INVENTION

The present invention provides an accelerometer including a field emitter to generate an electron beam current and a medium. An effect is generated when the electron beam current bombards the medium. The magnitude of the effect is affected by a physical impact imparting an amount of energy to the accelerometer to cause a relative movement between the field emitter and the medium. The amount of energy imparted to the accelerometer by the physical impact is determined by measuring the magnitude of the effect.

BRIEF DESCRIPTION OF THE DRAWINGS

FIG. 7A is a side, cross-section view of one embodiment of a storage device according to the present invention.

FIG. 7B is a top cross-sectional view of the storage device of FIG. 7A taken along lines 7B—7B from FIG. 7A.

FIG. 10A is a side, cross-section view of one embodiment of a storage device according to the present invention.

FIG. 10B is a top cross-sectional view of the storage device of FIG. 10A taken along lines 10B—10B from FIG. 10A.

DESCRIPTION OF THE PREFERRED EMBODIMENTS

Figure 1A:
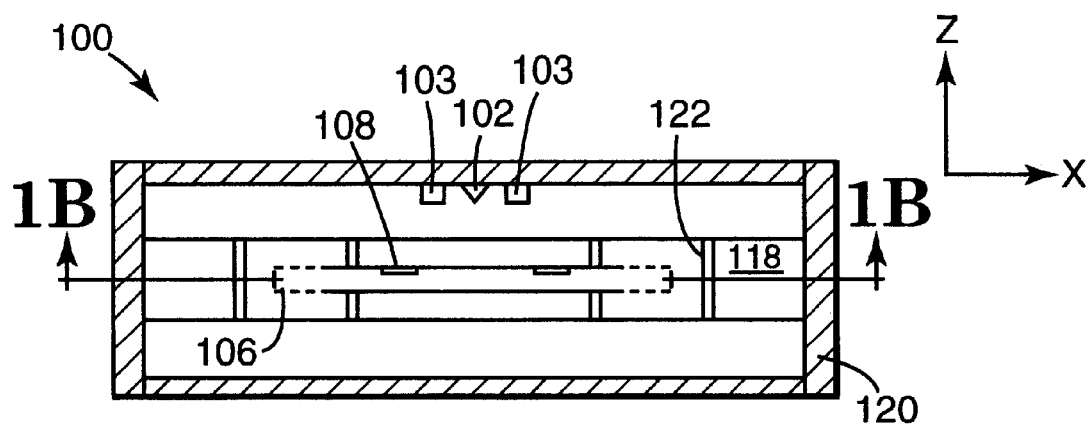
FIG. 1A is side, cross-section view of one embodiment of an accelerometer according to the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in limiting sense, and the scope of the present invention is defined by the appended claims. Like reference numerals are used to indicate like elements throughout the drawings.

FIG. 1A illustrates a side cross-sectional view of one embodiment of an accelerometer 100. Accelerometer 100 includes a field emitter 102 and a storage medium 106 including a number of storage areas, such as storage area 108. In one preferred embodiment, each storage area is responsible for storing one bit of information. A similar device, utilized as a storage device, is described in Gibson et al. U.S. Pat. No. 5,557,596, which is herein incorporated by reference.

In one embodiment, field emitter 102 is a point emitter having a relatively sharp point. The point emitter may have a radius of curvature in the range of approximately 1 nanometer to hundreds of nanometers. During operation, a pre-selected potential difference is applied between the field emitter 102 and its corresponding gate, such as circular gate 103 surrounding it. Due to the sharp point of the emitter, an electron beam current is extracted from the emitter toward the storage area. Depending on the distance between the emitters and the storage medium 106, the type of emitters, and the spot size (bit size) required, electron optics may be utilized to focus the electron beams. A voltage may also be applied to the storage medium 106 to either accelerate or decelerate the field-emitted electrons or to aid in focusing the field-emitted electrons.

In other embodiments, field emitter 102 is not a point emitter, but is another type of suitable electron emitter. For example, in one embodiment, field emitter 102 is a flat emitter, such as described in detail in the commonly assigned U.S. patent application Ser. No. 09/617,876 entitled "SELF-ALIGNED ELECTRON SOURCE DEVICE" filed Jul. 17, 2000, and which is herein incorporated by reference.

In one embodiment, a casing 120 maintains storage medium 106 in a partial vacuum, such as at least $10^{-5}$ torr. It is known in the art to fabricate such types of microfabricated field emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

As will be described, the field emitter is responsible for reading and writing information on the storage areas by means of the electron beam it produces. Thus, field emitters suitable for use in the accelerometer 100 are of the type that can produce electron beams that are narrow enough to achieve the desired bit density on the storage medium, and can provide the power density of the beam current needed for reading from and writing to the storage medium 106. A variety of ways are known in the art that are suitable to make such field emitters. For example, one method is disclosed in "Physical Properties of Thin-Film Emission Cathodes With Molybdenum Cones," by Spindt et al., published in the Journal of Applied Physics, Vol. 47, No. 12, December 1976. Another method is disclosed in "Fabrication and Characteristics of Si Field Emitter Arrays," by Betsui, published in Tech. Digest 4$^{th}$ Int. Vacuum Mircroelectronics Conf., Nagahama, Japan, page 26, 1991.

Figure 1B:
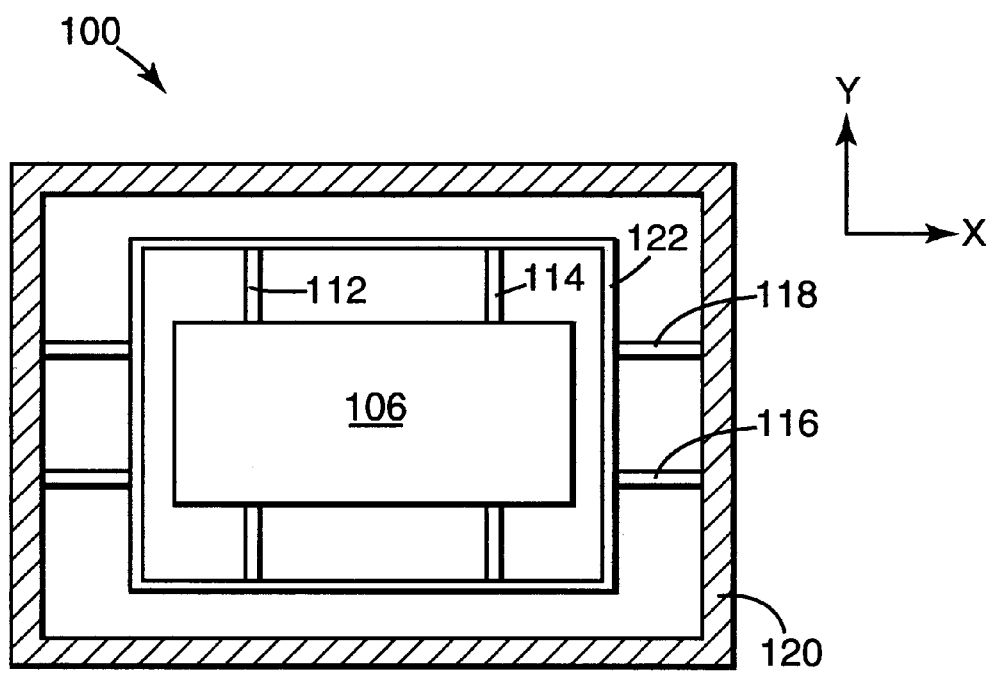
FIG. 1B is a top cross-sectional view of the accelerometer of FIG. 1A taken along lines 1B—1B from FIG. 1A.

FIG. 1B illustrates a top view of accelerometer 100 taken from the cross-section 1B—1B in FIG. 1A, illustrating storage medium 106 held by two sets of thin-walled microfabricated beams. The faces of the first set of thin-walled beams are in the Y-Z plane, such as indicated at 112 and 114. Thin-walled beams 112 and 114 may be flexed in the X direction allowing storage medium 106 to move in the X direction relative to casing 120. The faces of the second set of thin-walled beams are in the X-Z plane, such as indicated at 116 and 118. Thin-walled beams 116 and 118 allow storage medium 106 to move in the Y direction relative to casing 120. Storage medium 106 is held by the first set of beams, 112 and 114, which are connected to frame 122. Frame 122 is held by the second set of beams, 116 and 118, which are connected to casing 120.

Figure 2:
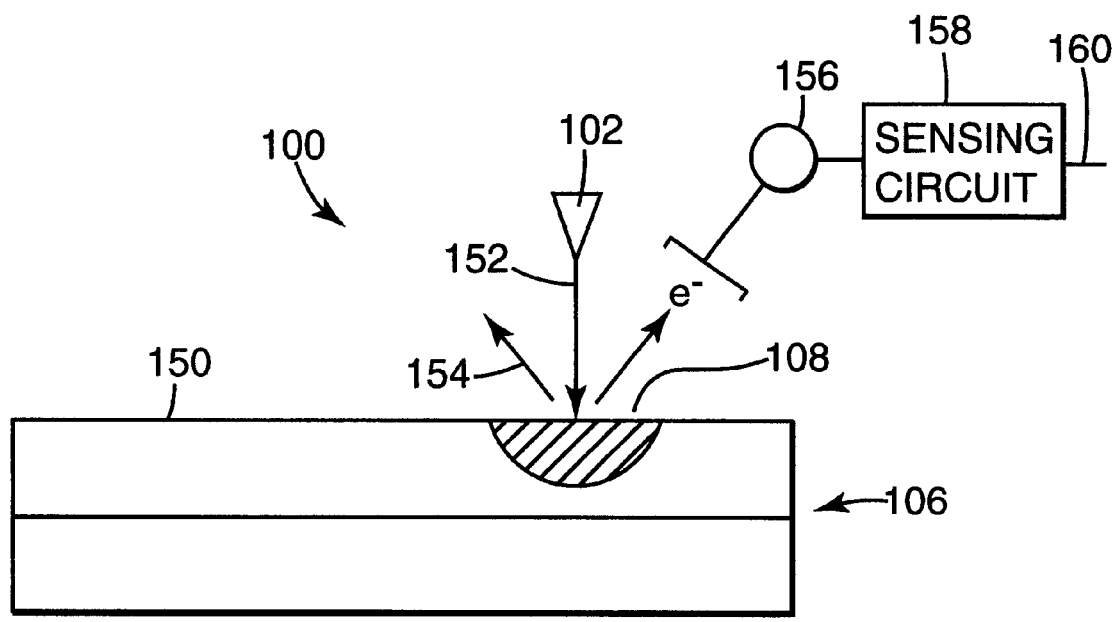
FIG. 2 is a diagram illustrating a field emitter reading from storage areas in one embodiment of an accelerometer according to the present invention.

FIG. 2 schematically illustrates field emitter 102 reading from storage medium 106 in accelerometer 100. The state of storage area 108 has been altered, while the state of storage area 150 has not been altered. When low-energy electron beam 152 bombards storage medium 106, secondary and back-scattered electrons are created. The secondary and back-scattered electrons 154 are then collected by electron collectors, such as indicated at 156. An area that has been modified, such as storage area 108, will produce a different number of secondary electrons and back-scattered electrons, as compared to an area that has not been modified, such as storage area 150. The difference may be more or may be less depending on the type of material and the type of modification. By monitoring the magnitude of the signal current collected by electron collectors 156, the state of the storage area, and thus the bit stored, can be identified.

In one method, writing is accomplished by temporarily increasing the power density of the electron beam current to modify the surface state of the storage area. Reading is accomplished by measuring the effect of the storage area on the electron beams, or the effect of the electron beams on the storage area. For example, a storage area that has been modified can represent a bit 1, and a storage area that has not been modified can represent a bit 0, and vice versa. In fact, the storage area can be modified to different degrees to represent more than two bits. Some modifications may be permanent, and some modifications may be reversible. The permanently modified storage medium is suitable for write-once-read-many memory (WORM).

In one embodiment, the structure of the storage area is altered in such a way as to vary its secondary electron emission coefficient (SEEC), its back-scattered electron coefficient (BEC), or the collection efficiency for secondary or back-scattered electrons emanating from the storage area. The SEEC is defined as the number of secondary electrons generated from the medium for each electron incident onto the surface of the medium. The BEC is defined as the fraction of the incident electrons that are scattered back from the medium. The collection efficiency for secondary/back-scattered electrons is the fraction of the secondary/back-scattered electrons that is collected by an electron collector, typically registered in the form of a current.

Reading is accomplished by collecting the secondary and/or back-scattered electrons when a lower power density electron beam is applied to storage medium 106. During reading, the power density of the electron beam should be kept low enough so that no further writing occurs.

One embodiment of storage medium 106 includes a material whose structural state can be changed from crystalline to amorphous by electron beams. The amorphous state has a different SEEC and BEC than the crystalline state, which leads to a different number of secondary and back-scattered electrons being emitted when the low power density electron beam is applied to the storage area. By measuring the number of secondary and back-scattered electrons emitted, the state of the storage area can be determined. To change the material from the amorphous to crystalline state, the electron beam power beam power density is first increased and then slowly decreased. This process heats the amorphous and then slowly cools it so that the area has time to anneal into its crystalline state. To change the material from crystalline to amorphous state, the beam power density is increased to a high level and then rapidly decreased. To read from the storage medium, a lower-energy beam is focused on a desired storage area. An example of such a type of material is germanium telluride (GeTe) and ternary alloys based on GeTe. Similar methods to modify states using laser beams as the heating source have been described in "Laser-induced Crystallization of Amorphous GeTe: A Time-Resolved Study," by Huber and Marinero, published in Physics Review B 36, page 1595, in 1987, and will not be further described here.

Other methods can also be used to induce a state change in storage medium 106. For example, a change in the topography of the medium, such as a hole or bump, will modify the SEEC and BEC of the storage medium. This modification occurs because the coefficients typically depend on the incident angle of the electron beam onto the storage area. Changes in material properties, band structure, and crystallography may also affect the coefficients. Also, the BEC depends on an atomic number, Z. Thus, one embodiment of a storage medium has a layer of low Z material on top of a layer of high Z material or vice versa, with writing accomplished through ablating some of the top layer with an electron beam.

Figure 3:
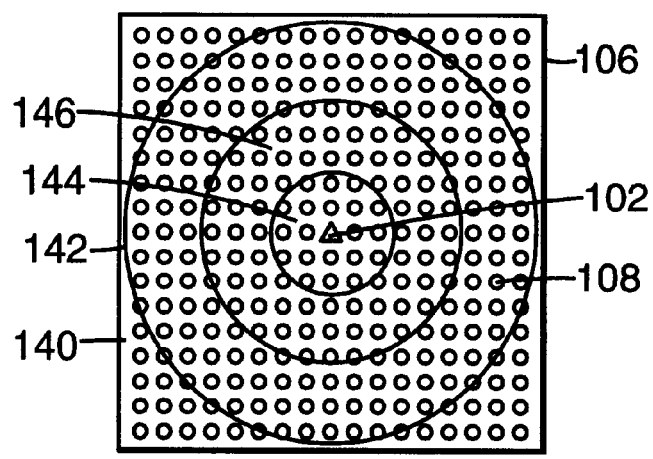
FIG. 3 is a top view of a portion of the storage medium of the accelerometer of FIG. 1A.

FIG. 3 illustrates the top view of one embodiment of storage medium 106 having a two-dimensional array of storage areas. Addressing the storage areas requires external circuits. In one embodiment, to reduce the number of external circuits, the storage medium is separated into rows, such as rows 140 and 142, where each row contains a number of storage areas. Each row is connected to an external circuit that monitors the magnitude of the signal current collected by electron collectors when the electron beam current from field emitter 102 bombards a storage area in that row. In one embodiment, stored information is configured in substantially concentric rings, such as rings 144 and 146, centered on field emitter 102, with each concentric information ring containing unique information identifying the given concentric information ring.

Figure 4A:
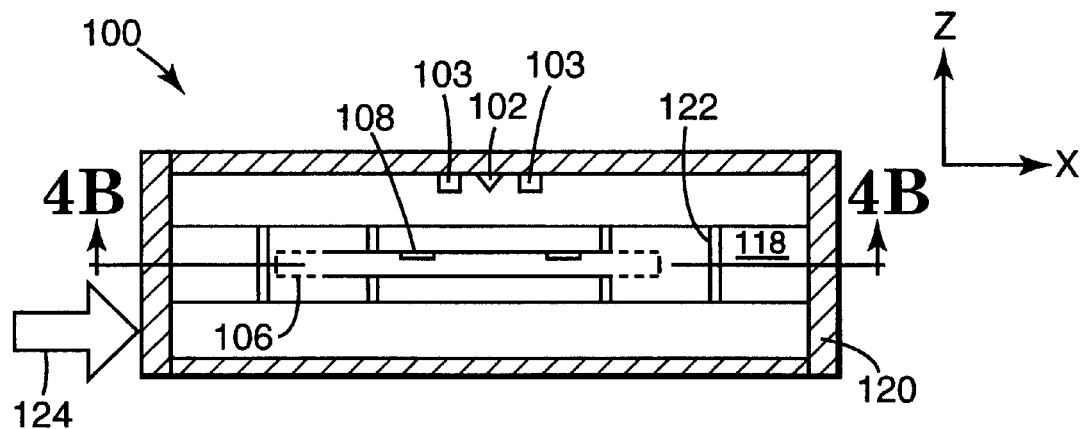
FIG. 4A is a side, cross-section view illustrating a response to a physical impact of the accelerometer of FIG. 1A.
Figure 4B:
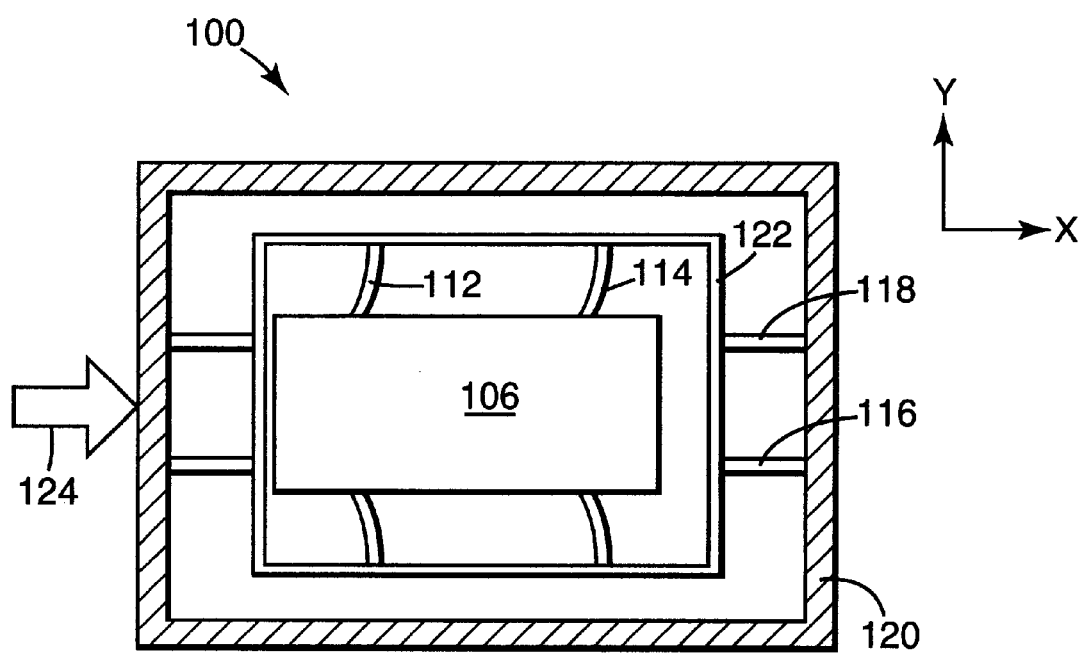
FIG. 4B is a top cross-sectional view of the accelerometer of FIG. 4A taken along lines 4B—4B from FIG. 4A, which further illustrates the response to the physical impact.
Figure 5:
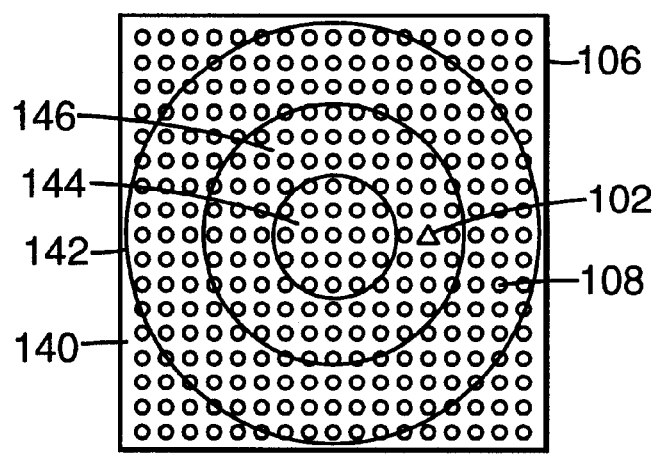
FIG. 5 is a top view of a portion of the storage medium of the accelerometer of FIG. 4A illustrating the response to the physical impact.

FIGS. 4A, 4B, and 5 illustrate the response of one embodiment of accelerometer 100 to a physical impact 124 that imparts an amount of energy to the accelerometer. Normally, field emitter 102 is centered over storage medium 106 as illustrated in FIGS. 1A and 3. However, when accelerometer 100 is physically impacted, such as by being bumped, thin-walled support beams 112 and 114 have spring-like characteristics, and correspondingly flex in the X direction while thin-walled support beams 116 and 118 remain substantially rigid. Consequently, the more energy that is imparted to accelerometer 100 by the physical impact 124, the further storage medium 106 moves in the -X direction relative to field emitter 102 and the further field emitter 102 is positioned over the outer concentric information rings, away from its centered position, as illustrated in FIGS. 4A and 5. Field emitter 102 emits a low-energy electron beam current that bombards and reads different storage areas as it passes over storage medium 106.

A sensing circuit 158 (shown in FIG. 2) monitors the signal current generated by electron collectors 156 and determines the information in storage areas 108, to thereby identify over which concentric information ring field emitter 102 is passing. Sensing circuit 158 provides an output signal 160 that is a function of the information in the concentric information ring. Accordingly, output signal 160 is a function of the quantity of energy imparted to accelerometer 100 by the physical impact 124. In one embodiment, output signal 160 represents a vector having a direction and a magnitude indicating the energy imparted to accelerometer 100.

In one embodiment, there are multiple field emitters similar to field emitter 102. Each of the field emitters generates a corresponding electron beam and are spread apart such that the electron beams can simultaneously bombard different stage areas as the corresponding field emitters pass over storage medium 106.

Figure 6:
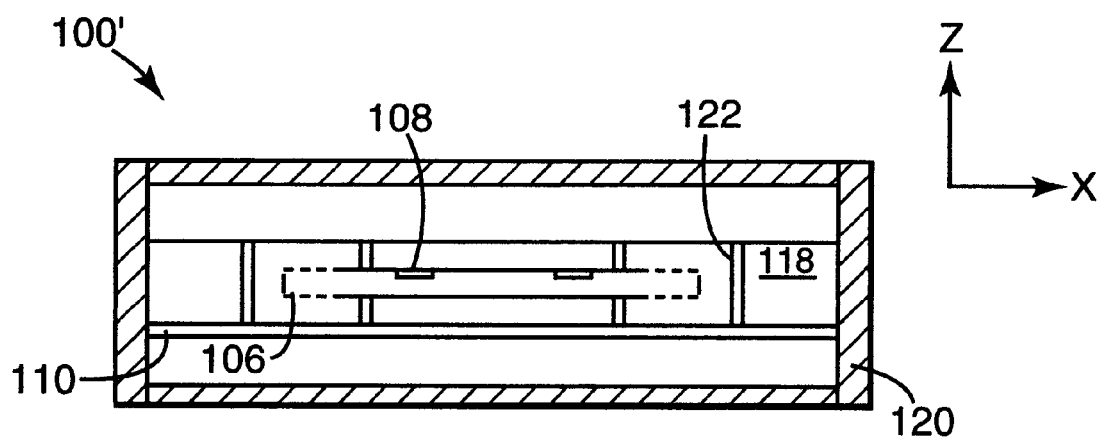
FIG. 6 is a side, cross-section view of one embodiment of an accelerometer incorporating a micromover according to the present invention.

FIG. 6 illustrates a side cross-sectional view of an accelerometer 100', which is similar to the above-described accelerometer 100 of FIG. 1A except that accelerometer 100' includes a micromover 110. In one embodiment, micromover 110 moves storage medium 106 relative to the field emitter 102. A general discussion of such a mircrofabricated micromover can be found, for example, in "Novel Polysilicon Comb Actuators for XY-Stages," published in the Proceeding of MicroElectro Mechanical Systems 1992, written by Jaecklin et al.; and in "Silicon Mircromechanics: Sensors and Actuators on a Chip," by Howe et al., published in IEEE Spectrum, page 29, in July 1990. In one embodiment, micromover 110 moves storage medium 106 in a substantially circular fashion relative to field emitter 102 and field emitter writes data to the storage medium in a concentric ring pattern, with each concentric ring containing unique information that identifies the given ring. Such a concentric information ring pattern is illustrated in FIG. 3. The sensitivity of accelerometer 100' to a physical impact is adjustable by controlling the width of the concentric information rings. The sensitivity of the accelerometer to a physical impact is proportional to the width of the concentric information rings, such that the sensitivity increases as the rings become more narrow.

In one embodiment, the sensitivity of the accelerometer to a physical impact is adjustable by controlling the spring constant of the thin-walled support beams 116, 117, 118 and 119. For example, in one embodiment of accelerometer 100', when micromover 110 is energized, the attractive forces between micromover 110 and storage medium 106 effectively increase the spring constants of the thin-walled support beams to stiffen the thin-walled support beams to thereby cause the support beams to be less sensitive to a physical impact.

One embodiment of a storage unit 300 is illustrated in FIGS. 7A and 7B. Storage unit 300 includes an accelerometer 100" and a data storage device 200, which is similar to storage devices described in the above-referenced Gibson et al. patent. Accelerometer 100" of storage unit 300 includes an accelerometer field emitter 102 an accelerometer portion 106a of a storage medium 106, including a number of storage areas, such as indicated at 108, and an accelerometer micromover 110. Data storage device 200 of storage unit 300 includes an array of data field emitters, such as indicated at 202, a data storage portion 106b of storage medium 106, including a number of storage areas, such as indicated at 208, and a data storage micromover 210.

FIG. 7B illustrates the top view of storage unit 300 taken from the cross-section 7B—7B in FIG. 3A, illustrating the accelerometer field emitter 102 and the array of data storage field emitters, such as indicated at 202, each independently held in place by two sets of thin-walled microfabricated beams. Accelerometer field emitter 102 is held by a first set of thin-walled beams, 112 and 114, which are connected to frame 122. Frame 122 is held by a second set of thin-walled beams, 116 and 118, which are connected to casing 120. The data field emitters, such as indicated at 202, are held by a first set of thin-walled beams, 212 and 214, which are connected to frame 222. Frame 222 is held by a second set of thin-walled beams, 216 and 218, which are connected to casing 120. The faces of thin-walled beams 112, 114, 212, and 214 are in the Y-Z plane and may be flexed in the X direction allowing the field emitters to move in the X direction. The faces of thin-walled beams 116, 118, 216, and 218 are in the X-Z plane and may be flexed in the Y direction allowing the field emitters to move in the Y direction.

In one embodiment, micromover 110 moves accelerometer field emitter 102 in a substantially circular fashion relative to storage medium 106, and field emitter 102 writes information to accelerometer portion 106a of storage medium 106 in a concentric ring pattern, with each concentric ring containing unique information that identifies the given ring. In one embodiment, sensitivity of accelerometer 100" to a physical impact is adjustable by controlling the width of the concentric information rings. The sensitivity of the accelerometer to a physical impact is proportional to the width of the concentric information rings, such that the sensitivity increases as the rings become more narrow.

In one embodiment, the sensitivity of accelerometer 100" to a physical impact is adjustable by controlling the spring constant of the thin-walled support beams 112, 114, 116 and 118. For example, in one embodiment of storage unit 300, when accelerometer micromover 110 is energized, the attractive forces between micromover 110 and accelerometer portion 106a of storage medium 106 effectively increase the spring constants of the thin-walled support beams to stiffen the thin-walled support beams to thereby cause the support beams to be less sensitive to a physical impact.

In one embodiment, there can be a two-dimensional array of data field emitters, such as indicated at 202, with an emitter pitch of 50 micrometers in both the X and the Y directions. Each data field emitter may access bits in tens of thousands to hundreds of millions of storage areas, such as indicted at 208. For example, the data field emitters, such as indicated 202, scan over the storage areas, such as indicated at 208, with a periodicity of about 1 to 100 nanometers between any two storage areas. Also, all of the data field emitters may be addressed simultaneously or in a multiplexed manner. Such a parallel accessing scheme significantly reduces access time, and increases the data rate of the data storage device 200.

Figure 8:
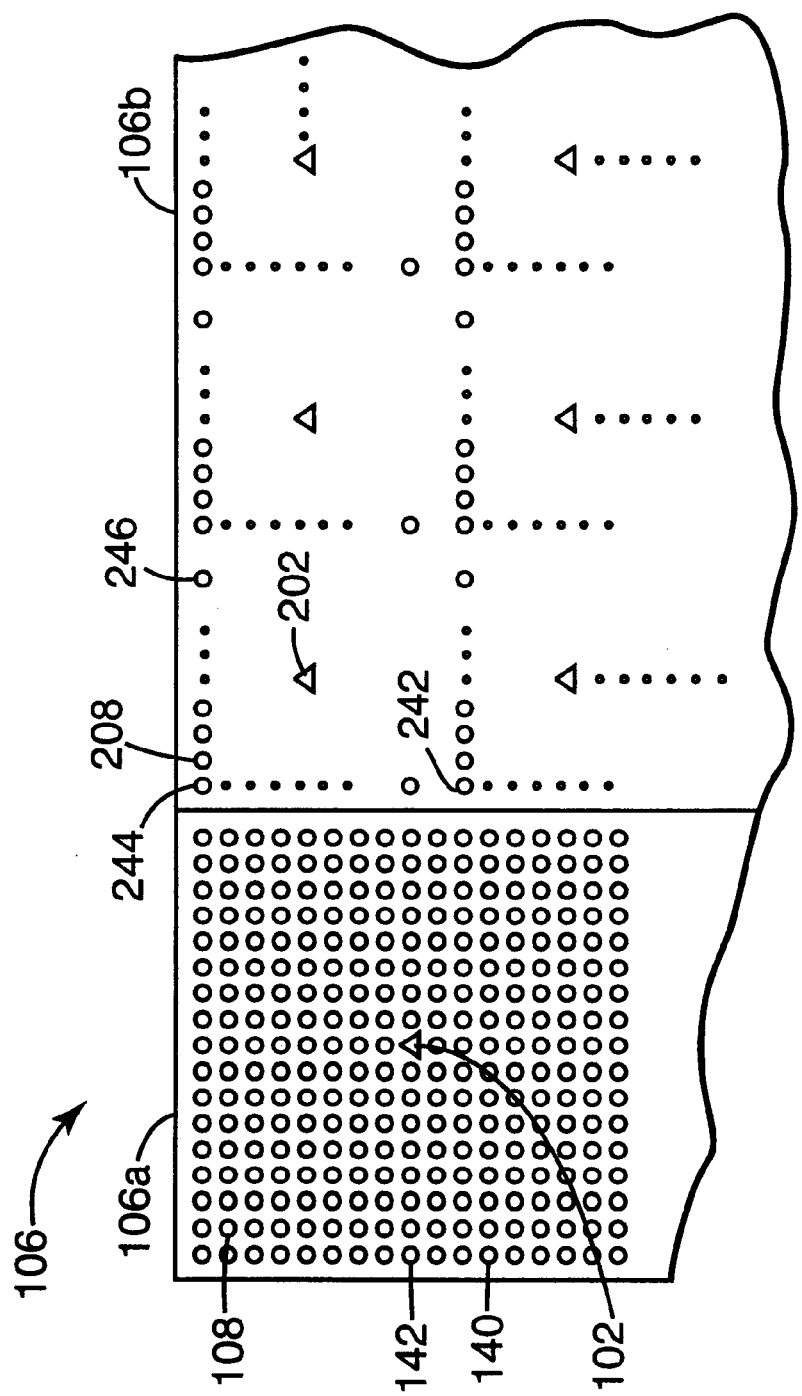
FIG. 8 is a top view of a portion of the storage medium of the storage device of FIG. 7A.

FIG. 8 illustrates the top view of one embodiment of storage medium 106 having a two-dimensional array of storage areas, such as storage area 108 of accelerometer portion 106a and storage area 208 of data storage portion 106b. Addressing the storage areas requires external circuits. In one embodiment, to reduce the number of external circuits, the accelerometer portion 106a of storage medium 106 is separated into rows, such as rows 140 and 142, where each row contains a number of storage area, such as storage area 108. Each row is connected to an external circuit that monitors the magnitude of the signal current collected by electron collectors when the electron beam current from accelerometer field emitter 102 bombards a storage area in that row.

In one embodiment, data storage portion 106b of storage medium 106 has a two-dimensional array of storage areas, such as storage area 208, and a two-dimensional array of data field emitters, such data field emitter 202. In one embodiment, to reduce the number of external circuits, the data storage portion 106b of storage medium 106 is separated into rows, such as rows 240 and 242, where each row contains a number of storage areas, such as storage area 208. Each data field emitter, such as data field emitter 202, is responsible for a number of rows. However, in this embodiment, each data field emitter is not responsible for the entire length of the rows. For example, data field emitter 202 is responsible for the storage areas within rows 240 through 242, and within columns 244 through 246. All rows of storage areas accessed by one emitter are connected to one external circuit. To address a storage area, the data field emitter responsible for that storage area is activated and micromover 210 (shown in FIG. 7A) moves that data field emitter to that storage area. The external circuit connected to the rows of storage areas within which that storage area lies is also activated.

Figure 9A:
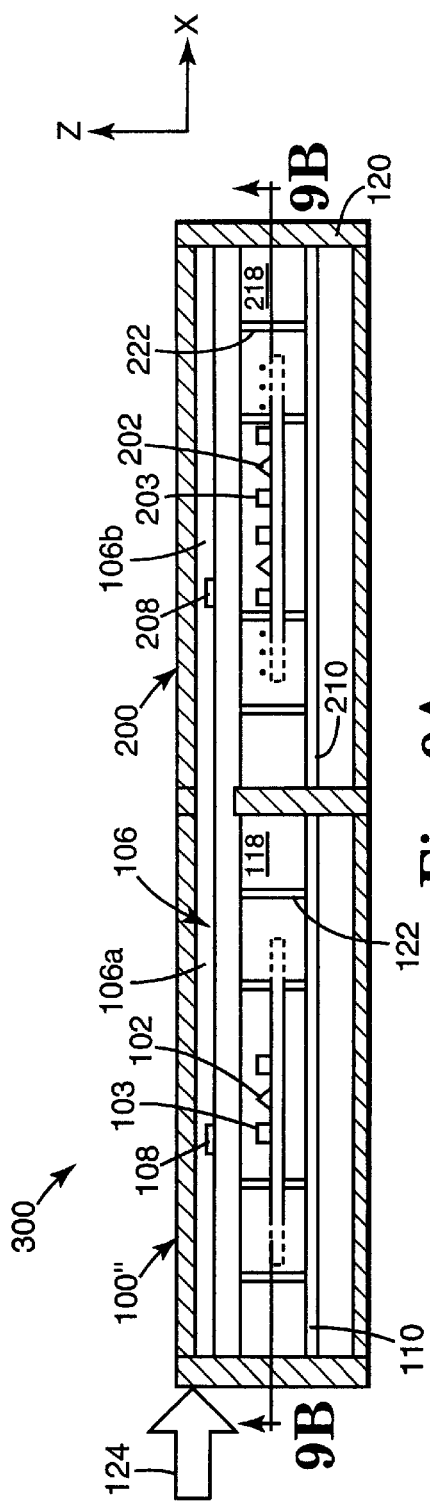
FIG. 9A is a side, cross-section view illustrating a response to a physical impact of the storage device of FIG. 7A.
Figure 9B:
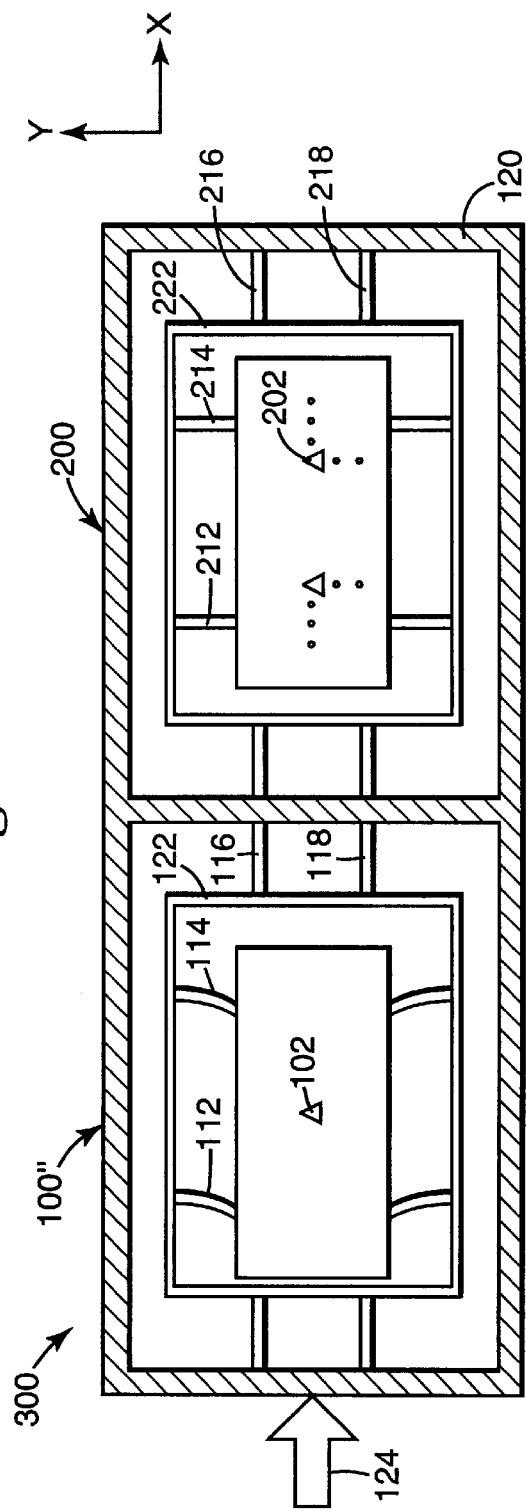
FIG. 9B is a top cross-sectional view of the storage device of FIG. 9A taken along lines 9B—9B from FIG. 9A, which further illustrates the response to the physical impact.

FIGS. 9A and 9B illustrate the response of storage unit 300 to a physical impact 124 that imparts an amount of energy to storage unit 300. Normally, accelerometer field emitter 102 is centered over accelerometer portion 106a of storage medium 106, as illustrated in FIGS. 7A and 8. However, when storage unit 300 is physically impacted, such as by being bumped, thin-walled support beams 112, 114, 212 and 214 have spring-like characteristics and correspondingly flex in the X direction, while thin-walled support beams 116, 118, 216 and 218 remain substantially rigid. Thin-walled support beams 112 and 114 holding accelerometer field emitter 102 have a lower spring constant than thin-walled support beams 212 and 214 holding the array of data field emitters 202. Therefore, thin-walled support beams 112 and 114 flex more easily than thin-walled support beams 212 and 214. Consequently, in response to the same physical impact 124, accelerometer field emitter 102 moves further, relative to casing 120, than the data field emitters, such as data field emitter 202.

The more energy that is imparted to accelerometer 100" of storage unit 300 by the physical impact 124, the further accelerometer field emitter 102 moves and the further field emitter 102 is positioned over the outer concentric information rings, away from its centered position, as illustrated in FIGS. 9A and 9B and similar to as illustrated in FIG. 5. Accelerometer field emitter 102 emits a low-energy electron beam current that bombards and reads different storage areas as it passes over accelerometer portion 106a of storage medium 106. Sensing circuit 158 (shown in FIG. 2) monitors the signal current generated by the electron collectors 156 and determines the information in storage areas 108 to thereby identify over which concentric information ring accelerometer field emitter 102 is passing. Sensing circuit 158 provides an output signal 160 that is a function of the information in the concentric information ring. Accordingly, output signal 160 is a function of the quantity of energy imparted to storage unit 300 by the physical impact 124. In one embodiment, output signal 160 represents a vector having a direction and magnitude indicating the energy imparted to accelerometer 100".

In one embodiment, sensing circuit 158 (shown in FIG. 2) detects the physical impact 124 and provides output signal 160 to data storage device 200 to indicate the amount of energy imparted to the data storage device by the physical impact. In response to output signal 160, data storage device 200 can respond in a number of ways, including temporarily halting reading/writing operations or performing a complete power down operation.

One embodiment of a storage unit 400 is illustrated in FIGS. 10A and 10B. Storage unit 400 includes an accelerometer 100''' and a data, storage device 200' which is similar to the data storage devices described in the above-incorporated Gibson et al. patent. Accelerometer 100''' of storage unit 400 includes an accelerometer field emitter 102, an accelerometer storage medium 106 including a number of storage areas such as storage area 108, and an accelerometer micromover 110. Data storage device 200' of storage unit 400 includes an array of data field emitters, such as field emitter 202, a data storage medium 206 including a number of storage areas, such as storage area 208, and a data micromover 210.

FIG. 10B illustrates the top view of storage unit 400 taken from the cross-section 10B—10B in FIG. 10A, illustrating the accelerometer storage medium 106 and the data storage medium 206, each independently held in place by two sets of thin-walled microfabricated beams. Accelerometer storage medium 106 is held by a first set of thin-walled beams, 112 and 114, which are connected to frame 122. Frame 122 is held by a second set of thin-walled beams, 116 and 118, which are connected to casing 120. Data storage medium 206 is held by a first set of thin-walled beams, 212 and 214, which are connected to frame 222. Frame 222 is held by a second set of thin-walled beams, 216 and 218, which are connected to casing 120. The faces of thin-walled beams 112, 114, 212, and 214 are in the Y-Z plane and may be flexed in the X direction allowing the each storage medium to move in the X direction. The faces of thin-walled beams 116, 118, 216, and 218 are in the X-Z plane and may be flexed in the Y direction allowing each storage medium to move in the Y direction.

In one embodiment, micromover 110 moves accelerometer storage medium 106 in a substantially circular fashion relative to accelerometer field emitter 102 and field emitter 102 writes data to the storage medium 106 in a concentric ring pattern, with each concentric ring containing unique information that identifies the given ring. Such a concentric information ring pattern is illustrated in FIG. 3. In one embodiment, the sensitivity of accelerometer 100''' to a physical impact is adjustable by controlling the width of the concentric information rings. The sensitivity of the accelerometer to physical impact is proportional to the width of the concentric information rings, such that the sensitivity increases as the rings become more narrow.

In one embodiment, the sensitivity of accelerometer 100''' to a physical impact is adjustable by controlling the spring constant of the thin-walled support beams 112, 114, 116, and 118. For example, in one embodiment of storage unit 400, when micromover 110 is energized, the attractive forces between micromover 110 and storage medium 106 effectively increase the spring constants of the thin-walled support beams to stiffen the thin-walled support beams to thereby cause the support beams to be less sensitive to a physical impact.

In one embodiment, there can be a two-dimensional array of data field emitters, such as data field emitter 202, with an emitter pitch of 50 micrometers in both the X and the Y directions. Each data field emitter may access bits in tens of thousands to hundreds of millions of storage areas, such as storage area 208. For example, the data field emitters, such as data field emitter 202, scan over the storage areas, such as storage area 208, with a periodicity of about 1 to 100 nanometers between any two storage areas. Also, all of the data field emitters may be addressed simultaneously or in a multiplexed manner. Such a parallel accessing scheme significantly reduces access time, and increases the data rate of the data storage device 200'.

Figure 11:
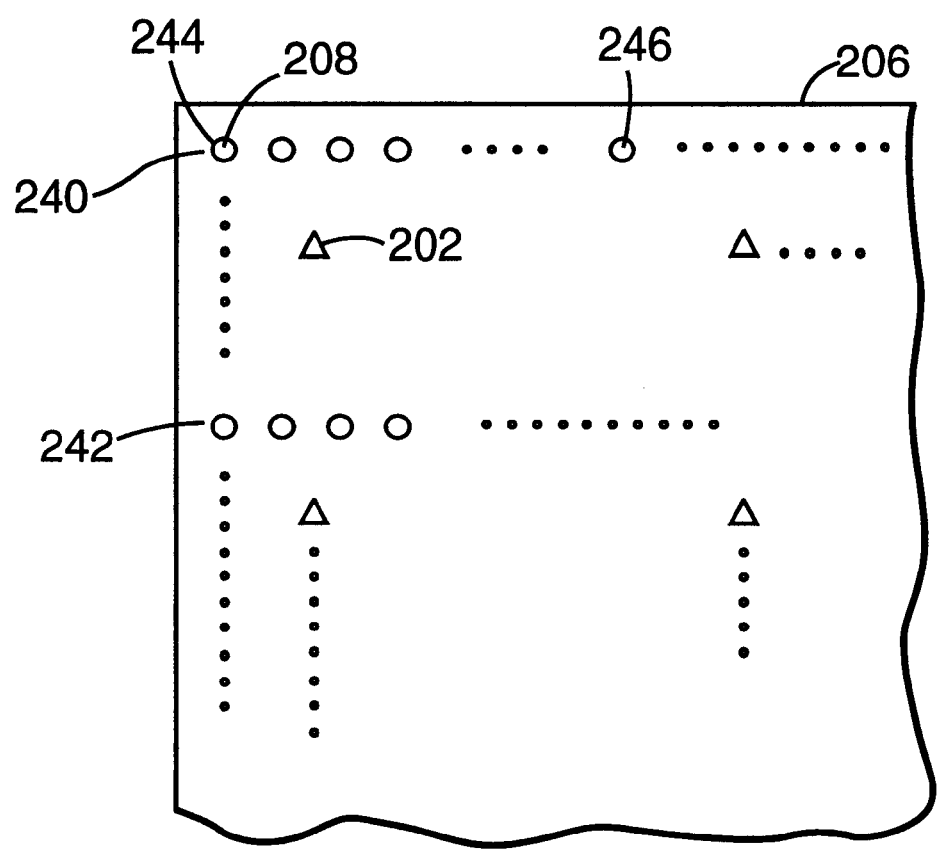
FIG. 11 is a top view of a portion of the storage medium of the storage device of FIG. 10A.

FIG. 11 illustrates the top view of one embodiment of data storage medium 206 having a two-dimensional array of storage areas, such as storage area 208, and a two-dimensional array of data field emitters, such data field emitter 202. Addressing the storage areas requires external circuits. In one embodiment, to reduce the number of external circuits, storage medium 206 is separated into rows, such as rows 240 and 242, where each row contains a number of storage areas such as storage area 208. Each data field emitter, such as data field emitter 202, is responsible for a number of rows. However, in this embodiment, each data field emitter is not responsible for the entire length of the rows. For example, data field emitter 202 is responsible for the storage areas within rows 240 through 242, and within columns 244 through 246. All rows of storage areas accessed by one emitter are connected to one external circuit. To address a storage area, the data field emitter responsible for that storage area is activated and micromover 210 (shown in FIG. 10A) moves that data field emitter to that storage area. The external circuit connected to the rows of storage areas within which that storage area lies is also activated.

Figure 12A:
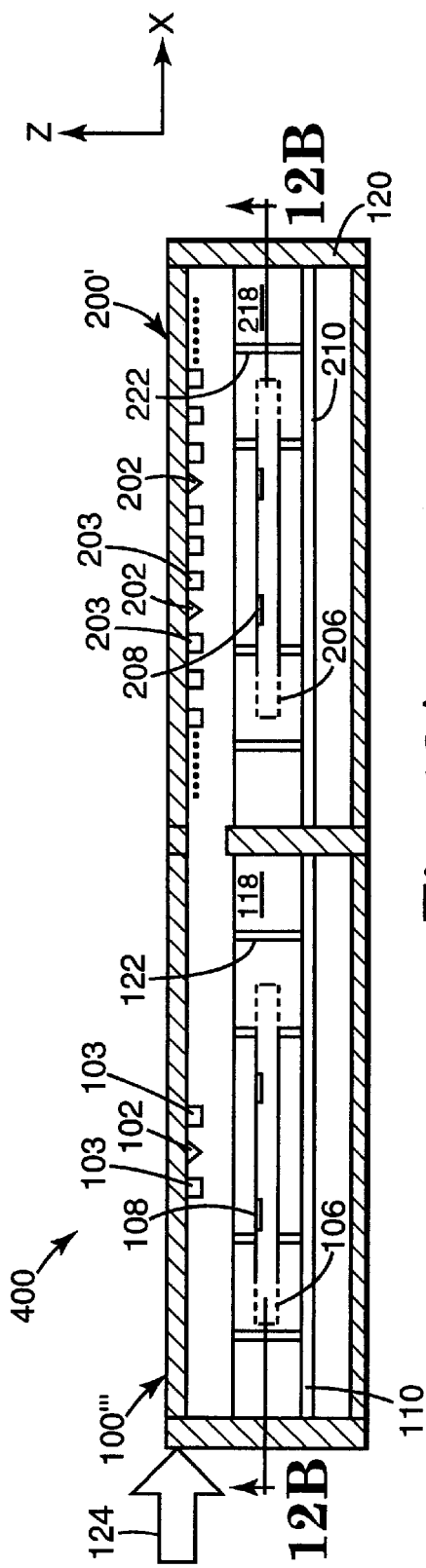
FIG. 12A is a side, cross-section view illustrating a response to a physical impact of the storage device of FIG. 10A.
Figure 12B:
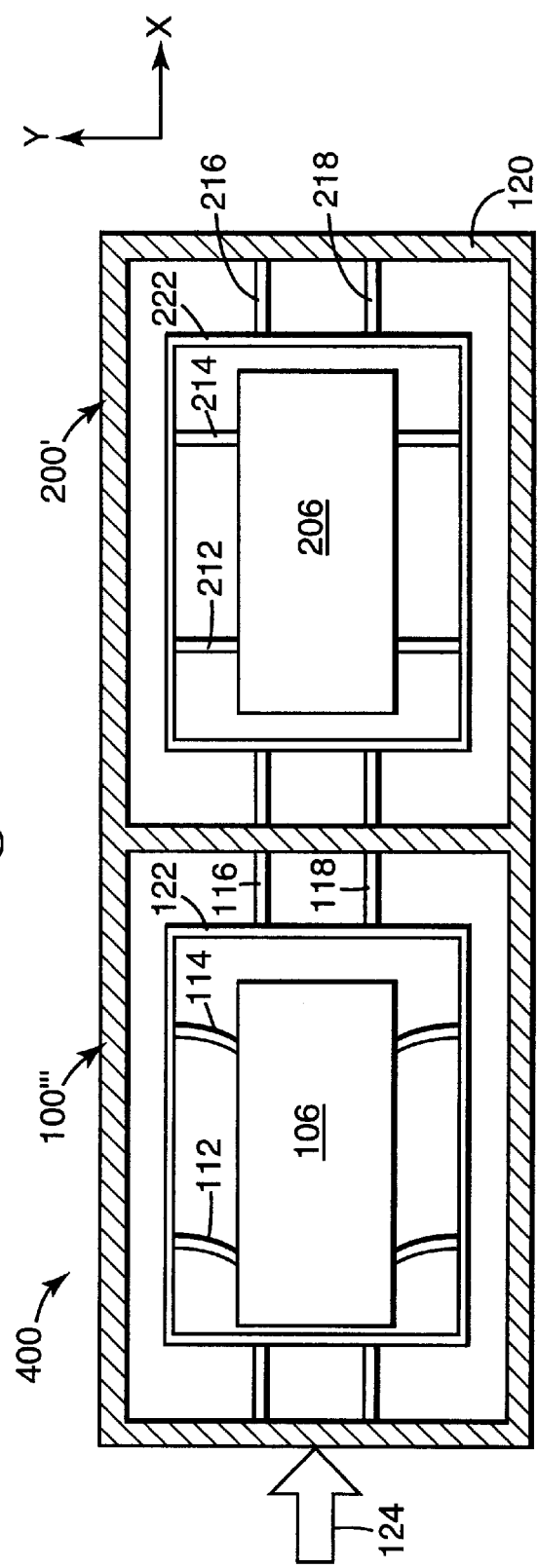
FIG. 12B is a top cross-sectional view of the storage device of FIG. 12A taken along lines 12B—12B from FIG. 12A, which further illustrates the response to the physical impact.

FIGS. 12A and 12B illustrate the response of storage unit 400 to a physical impact 124 that imparts an amount of energy to storage unit 400. Normally, accelerometer field emitter 102 is centered over storage medium 106 as illustrated in FIGS. 10A and 3. However, when storage unit 400 is physically impacted, such as by being bumped, thin-walled support beams 112, 114, 212, and 214 have spring-like characteristics and correspondingly flex in the X direction, while support beams 116, 118, 216, and 218 remain substantially rigid. Thin-walled support beams 112 and 114 holding accelerometer storage medium 106 have a lower spring constant than thin-walled support beams 212 and 214 holding data storage medium 206. Therefore, thin-walled support beams 112 and 114 flex more easily than thin-walled support beams 212 and 214. Consequently, in response to the same physical impact 124, accelerometer storage medium 106 moves further, relative to casing 120, than data storage medium 206.

The more energy that is imparted to accelerometer 100''' of storage unit 400 by the physical impact 124 the further accelerometer storage medium 106 moves and the further accelerometer field emitter 102 is positioned over the outer concentric information rings, away from its centered position, as illustrated in FIGS. 12A and 12B and FIG. 5. Accelerometer field emitter 102 emits a low-energy electron beam current that bombards and reads different storage areas as it passes over storage medium 106. Sensing circuit 158 (shown in FIG. 2) monitors the signal current generated by the electron collectors 156 and determines the information in storage areas 108 to thereby identify over which concentric information ring accelerometer field emitter 102 is passing. Sensing circuit 158 provides an output signal 160 that is a function of the information in the concentric information ring. Accordingly, output signal 160 is a function of the quantity of energy imparted to storage unit 400 by the physical impact 124. In one embodiment, output signal 160 represents a vector having a direction and a magnitude indicating the energy imparted to accelerometer 100'''.

In one embodiment, sensing circuit 158 (shown in FIG. 2) detects the physical impact 124 and provides output signal 160 to data storage device 200' to indicate the amount of energy imparted to the data storage device by the physical impact. In response to output signal 160, data storage device 200' can respond in a number of ways, including temporarily halting reading/writing operations or performing a power down operation.

Figure 13:
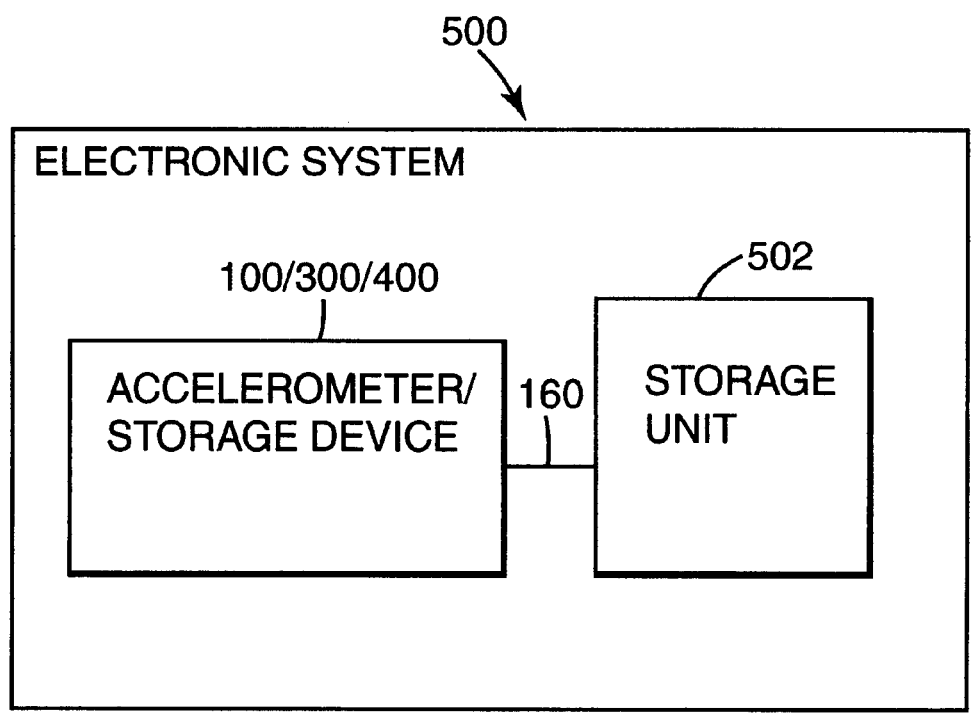
FIG. 13 is a diagram of an electronic system having an accelerometer according to the present invention.

One embodiment of an electronic system 500 is illustrated in FIG. 13. Electronic system includes a storage unit 502, such as a CD-ROM or other standard storage device. Electronic system 500 also includes an accelerometer 100, an accelerometer 100', a storage unit 300 having accelerometer 100", a storage unit 400 having accelerometer 100''', or another embodiment of an accelerometer accordingly to the present invention. One example embodiment of electronic system 500 is a portable electronic system wherein storage unit 502 can be affected by physical impacts. In such a portable electronic system 500, the accelerometer according to the present invention, such as accelerometer 100, 100', 100", or 100''', provides an output signal 160 that is a function of the quantity of energy imparted to electronic system 500 by a given physical impact. The accelerometer 100/100'/100"/100''' provides the output signal 160 via sensing circuit 158 to storage unit 502. Storage unit 502 can respond to output signal 160 in a number of ways, including temporarily halting reading/writing operations in the storage unit or performing a power down operation of the storage unit or electronic system.

The accelerometer according to the present invention can provide a reliable and accurate means of sensing physical impact on a storage device. In addition, the accelerometer according to the present invention can be implemented inexpensively. The accelerometer according to the present invention can be implemented independently, such as accelerometer 100 illustrated in FIGS. 1A and 1B. The accelerometer according to the present invention can be implemented with a micromover, such as accelerometer 100' in FIG. 6. The accelerometer according to the present invention can be incorporated into a storage unit, such as accelerometer 100" of storage unit 300 illustrated in FIGS. 7A and 7B, wherein a storage medium 106 is shared between accelerometer field emitter 102 and data field emitters, such as data field emitter 202. The accelerometer according to the present invention can also be incorporated into a storage unit, such as accelerometer 100''' of storage unit 400 wherein accelerometer 100''' includes its own accelerometer storage medium 106 and data storage device 200' includes its own data storage medium 206. In the storage unit 300 and the storage unit 400 according to the present invention, an accelerometer (100"/100''') is implemented integrally with a data storage device (200/200') in a storage unit with the same type of field emitter technology as the data storage device. Moreover, the accelerometer according to the present invention can be implemented in any electronic system having a storage unit, such as electronic system 500 where the accelerometer is implemented in a field emitter technology which is different than the non-field emitter technology of one or more storage units in the electronic system.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An accelerometer comprising:
   a field emitter to generate an electron beam current; and
   a medium including storage areas for storing information such that:
      an effect is generated when the electron beam current bombards the medium;
      the magnitude of the effect is affected by a physical impact imparting an amount of energy to the accelerometer to cause a relative movement between the field emitter and the medium; and
      the amount of energy imparted to the accelerometer by the physical impact is determined by measuring the magnitude of the effect, and wherein a sensitivity of the accelerometer to the physical impact is adjustable by controlling a configuration of the information stored in the medium.

2. The accelerometer of claim 1, wherein the effect is a signal current.

3. The accelerometer of claim 2 further comprising:
   a sensing circuit measuring the signal current.

4. The accelerometer of claim 3, wherein the sensing circuit provides an output signal that is a function of the amount of energy imparted to the accelerometer by the physical impact.

5. The accelerometer of claim 1, wherein the field emitter and the medium are moveable relative to each other.

6. The accelerometer of claim 1, wherein the field emitter and the medium accelerate at different rates when the physical impact imparts the amount of energy to the accelerometer.

7. The field emitter of claim 1, wherein the field emitter is substantially stationary and the medium is moveable relative to the field emitter.

8. The field emitter of claim 1, wherein the medium is substantially stationary and the field emitter is moveable relative to the medium.

9. The accelerometer of claim 1, wherein the medium includes storage areas and the accelerometer further comprises:
   a mircrofabricated mover changing the relative positions between the field emitter and the storage areas to cause different storage areas to be bombarded by the electron beam current.

10. The accelerometer of claim 9, wherein the medium has a spring constant and wherein the microfabricated mover adjusts a sensitivity of the accelerometer to the physical impact by controlling the spring constant of the medium.

11. The accelerometer of claim 1, wherein the medium has a spring constant and wherein a sensitivity of the accelerometer to the physical impact is adjustable by controlling the spring constant of the medium.

12. The accelerometer of claim 1, wherein information stored in the storage areas is configured in concentric information rings centered on the field emitter, with each concentric information ring containing unique information identifying the given concentric information ring.

13. The accelerometer of claim 12, wherein the sensitivity of the accelerometer to the physical impact is adjustable by controlling widths of the concentric information rings.

14. The accelerometer of claim 1 wherein the field emitter is made by semiconductor microfabrication techniques and the medium is in close proximity to the field emitter.

15. The accelerometer of claim 1 further comprising:
   a plurality of field emitters, each of the plurality of field emitters generating a corresponding electron beam, the plurality of field emitters being spaced apart such that:

an effect is generated when each of the corresponding electron beam currents bombards the medium;

the magnitude of each of the effects is affected by the physical impact imparting the amount of energy to the accelerometer; and the amount of energy imparted to the accelerometer by the physical impact is determined by measuring the magnitude of each of the effects.

16. The accelerometer of claim 1 wherein measuring the magnitude of the effect determines a vector having a direction and a magnitude representing the amount of energy imparted to the accelerometer.

17. A storage device comprising:

a field emitter made by semiconductor microfabrication techniques to generate an electron beam current; and a storage medium in close proximity to the field emitter, the storage medium having a plurality of storage areas for storing information, the storage areas being in one of a plurality of states to represent the information stored in that storage area such that:

an effect is generated when the electron beam current bombards the storage medium;

the magnitude of the effect is affected by a physical impact imparting an amount of energy to the storage device to cause a relative movement between the field emitter and the medium; and the amount of energy imparted to the storage device by the physical impact is determined by measuring the magnitude of the effect, wherein a sensitivity of the storage device to the physical impact is adjustable by controlling a configuration of the information stored in the storage medium.

18. The storage device of claim 17 further comprising:

a second field emitter made by microfabrication techniques to generate a second electron beam current, wherein the storage areas are in close proximity to the second field emitter, such that:

a second effect is generated when the second electron beam current bombards a storage area;

the magnitude of the second effect depends on the state of the storage area; and the information stored in the storage area is read by measuring the magnitude of the effect.

19. The storage device of claim 18, wherein:

the storage medium is substantially stationary;

the first field emitter and second field emitter are movable relative to the storage medium; and the first field emitter has a lower spring constant relative to the second field emitter so that the first field emitter is more moveable in response to a physical impact imparting an amount of energy to the storage device.

20. The storage device of claim 18 further comprising:

a plurality of field emitters, with each being similar to the second field emitter, the plurality of field emitters being spaced apart with each field emitter being responsible for a number of storage areas on the storage medium, such that a plurality of the field emitters simultaneously read information from the storage medium.

21. The storage device of claim 17 further comprising:

a microfabricated mover changing the relative positions between the field emitter and the storage areas to cause different storage areas to be bombarded by the electron beam current.

22. The storage device of claim 21 further comprising:

a second field emitter made by microfabrication techniques to generate a second electron beam current, wherein the storage areas are in close proximity to the second field emitter; and a second mircrofabricated mover changing the relative positions between the second field emitter and the storage areas to cause different storage areas to be bombarded by the second electron beam current, such that:

a second effect is generated when the second electron beam current bombards a storage area;

the magnitude of the second effect depends on the state of the storage area; and the information stored in the storage area is read by measuring the magnitude of the effect.

23. The storage device of claim 17 further comprising:

a second field emitter made by microfabrication techniques to generate a second electron beam current;

a second storage medium having storage areas that are in close proximity to the second field emitter; and a second microfabricated mover changing the relative positions between the second field emitter and the storage areas on the second storage medium to cause different storage areas to be bombarded by the second electron beam current, such that:

a second effect is generated when the second electron beam current bombards a storage area in the second storage medium;

the magnitude of the second effect depends on the state of the storage area; and the information stored in the storage area is read by measuring the magnitude of the effect.

24. The storage device of claim 23 wherein the first field emitter and second field emitter are substantially stationary;

the first storage medium and second storage medium are movable relative to the first and second field emitters, respectively; and the first storage medium has a lower spring constant relative to the second storage area so that the first storage area is more moveable in response to a physical impact imparting an amount of energy to the storage device.

25. The storage device of claim 23 further comprising:

a plurality of field emitters, with each being similar to the second field emitter, the plurality of field emitters being spaced apart with each emitter being responsible for a number of storage areas on the second storage medium, such that a plurality of the field emitters simultaneously read information from the storage medium.

26. The storage device of claim 17 further comprising:

a sensing circuit providing an output signal that is a function of the amount of energy imparted to the storage device by the physical impact.

27. An electronic system comprising:

a storage unit; and an accelerometer including:

a field emitter to generate an electron beam current; and a medium including storage areas for storing information such that:

an effect is generated when the electron beam current bombards the medium;

the magnitude of the effect is affected by a physical impact imparting an amount of energy to the accelerometer to cause a relative movement between the field emitter and the medium; and the amount of energy imparted to the accelerometer by the physical impact is determined by measuring the magnitude of the effect, wherein a sensitivity of the accelerometer to the physical impact is adjustable by controlling a configuration of the information stored in the medium.

28. A method of sensing a physical impact to a device, the method comprising:

generating an electron beam current with a field emitter;

generating an effect by bombarding a medium with the electron beam current, the medium including storage areas for storing information, wherein the magnitude of the effect is affected by the physical impact imparting an amount of energy to the device to cause a relative movement between the field emitter and the medium; and determining the amount of energy imparted to the device by the physical impact by measuring the magnitude of the effect, wherein a sensitivity of the device to the physical impact is adjustable by controlling a configuration of the information stored in the medium.

29. The method of claim 28, wherein the field emitter and the medium are moveable relative to each other.

30. The method of claim 28, wherein the field emitter and the medium accelerate at different rates when the physical impact imparts the amount of energy to the device.

31. The method of claim 28, wherein the field emitter is substantially stationary and the medium is moveable relative to the field emitter.

32. The method of claim 28, wherein the medium is substantially stationary and the field emitter is moveable relative to the medium.

33. The method of claim 28, wherein the medium includes storage areas and the method further comprises:

changing the relative positions between the field emitter and the storage areas to cause different storage areas to be bombarded by the electron beam current.

34. The method of claim 28 further comprising:

adjusting the sensitivity of the device to the physical impact by controlling a spring constant of the medium.

35. The method of claim 28, further comprising:

adjusting the sensitivity of the device to the physical impact by configuring the information stored in the storage areas in concentric information rings centered on the field emitter, with each concentric information ring containing unique information identifying the given concentric information ring.

36. The method of claim 35, wherein the adjusting the sensitivity further includes controlling widths of the concentric information rings.

* * * * *